US010237338B1

(12) United States Patent
Torpy et al.

(10) Patent No.: US 10,237,338 B1
(45) Date of Patent: Mar. 19, 2019

(54) DYNAMICALLY DISTRIBUTING PROCESSING AMONG NODES IN A WIRELESS MESH NETWORK

(71) Applicant: Landis+Gyr Innovations, Inc., Alpharetta, GA (US)

(72) Inventors: Keith Torpy, South Sydney Business Hub (AU); Ruben Salazar, Johns Creek, GA (US); David Decker, Atlanta, GA (US); James Randall Turner, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 15/965,202

(22) Filed: Apr. 27, 2018

(51) Int. Cl.

| | |
|---|---|
| ***H04W 84/18*** | (2009.01) |
| ***H04L 12/751*** | (2013.01) |
| ***H04L 29/08*** | (2006.01) |
| ***H04L 12/707*** | (2013.01) |

(52) U.S. Cl.

CPC .............. *H04L 67/10* (2013.01); *H04L 45/02* (2013.01); *H04L 45/22* (2013.01); *H04L 67/12* (2013.01); *H04W 84/18* (2013.01)

(58) Field of Classification Search

CPC ........ H04W 84/18; H04L 45/22; H04L 45/02; H04L 67/12

See application file for complete search history.

(56) References Cited

U.S. PATENT DOCUMENTS

2013/0013125 A1* 1/2013 Booth ................ H02J 13/0013 700/298

2013/0110425 A1* 5/2013 Sharma ................. G01R 29/16 702/62

2015/0256435 A1* 9/2015 Sum ...................... G01R 25/00 702/62

* cited by examiner

*Primary Examiner* — Gbemileke J Onamuti

(74) *Attorney, Agent, or Firm* — Kilpatrick Townsend & Stockton LLP

(57) ABSTRACT

A service node performs computational tasks or other operations on behalf of a meter or other network device. A meter may collect data regarding electric parameters associated with an electric distribution network. When analysis of the collected data is required, the meter may determine that it requires the resources of a service node. The meter may send a request to a directory node to identify a service node or it may send a request seeking a service node. The service node performs the analysis and sends the results of the analysis back to the meter. The service nodes supports the dynamic distributed processing of analytic services.

18 Claims, 6 Drawing Sheets

DYNAMICALLY DISTRIBUTING PROCESSING AMONG NODES IN A WIRELESS MESH NETWORK

TECHNICAL FIELD

This disclosure generally relates to distributed processing, and more particularly relates to dynamically distributing processing among nodes of a wireless mesh network.

BACKGROUND

In an electric distribution network or grid, computational tasks, such as analyzing and storing data, are typically centralized and performed at the head-end system. The data collected by the endpoints is sent to the head-end system and the head-end system handles the analysis and decision-making. The head-end system may use the data to make decisions, control resources within the electric distribution network, or optimize the use of resources. However, there are some disadvantages to relying on the head-end system to perform the analysis, including the delay between the time the data is collected by an endpoint and the time the data is analyzed by the head-end system and the amount of communication bandwidth required to send the data to the head-end system.

By dynamically distributing computational tasks and other services, these issues can be addressed, and advantages can be obtained. Advantages may include obtaining results with less delay, using fewer head-end processing resources when scaling, using less network bandwidth, minimizing the overall cost, improving fault tolerance, and improving scalability.

SUMMARY

Aspects of the invention provide distributed service nodes, which perform data analysis or other operations on behalf of a meter or other network device. A meter collects data regarding electric parameters. When analysis of the collected data or another type of computational task is required, the meter may determine that it requires the resources of a service node. The meter may send a service request to a directory node requesting assistance in locating a suitable service node or the meter may send a service request seeking a suitable service node. The service request may include an indication of the type of service needed, the collected data, and the meter's address. Once a service node is identified, the service node satisfies the service request and sends the results of the analysis back to the meter. Service nodes support the distributed processing of computational tasks, including, but not limited to grid analytic services, such as monitoring transformers, determining feeder voltages, and configuring feeder switches, information services, computational services, storage services, and translation services.

These illustrative examples are mentioned not to limit or define the disclosure, but to provide examples to aid understanding thereof. Additional examples are discussed in the Detailed Description, and further description is provided there.

BRIEF DESCRIPTION OF THE DRAWINGS

Features, examples, and advantages of the present disclosure are better understood when the following Detailed Description is read with reference to the accompanying drawings.

DETAILED DESCRIPTION

Figure 1:
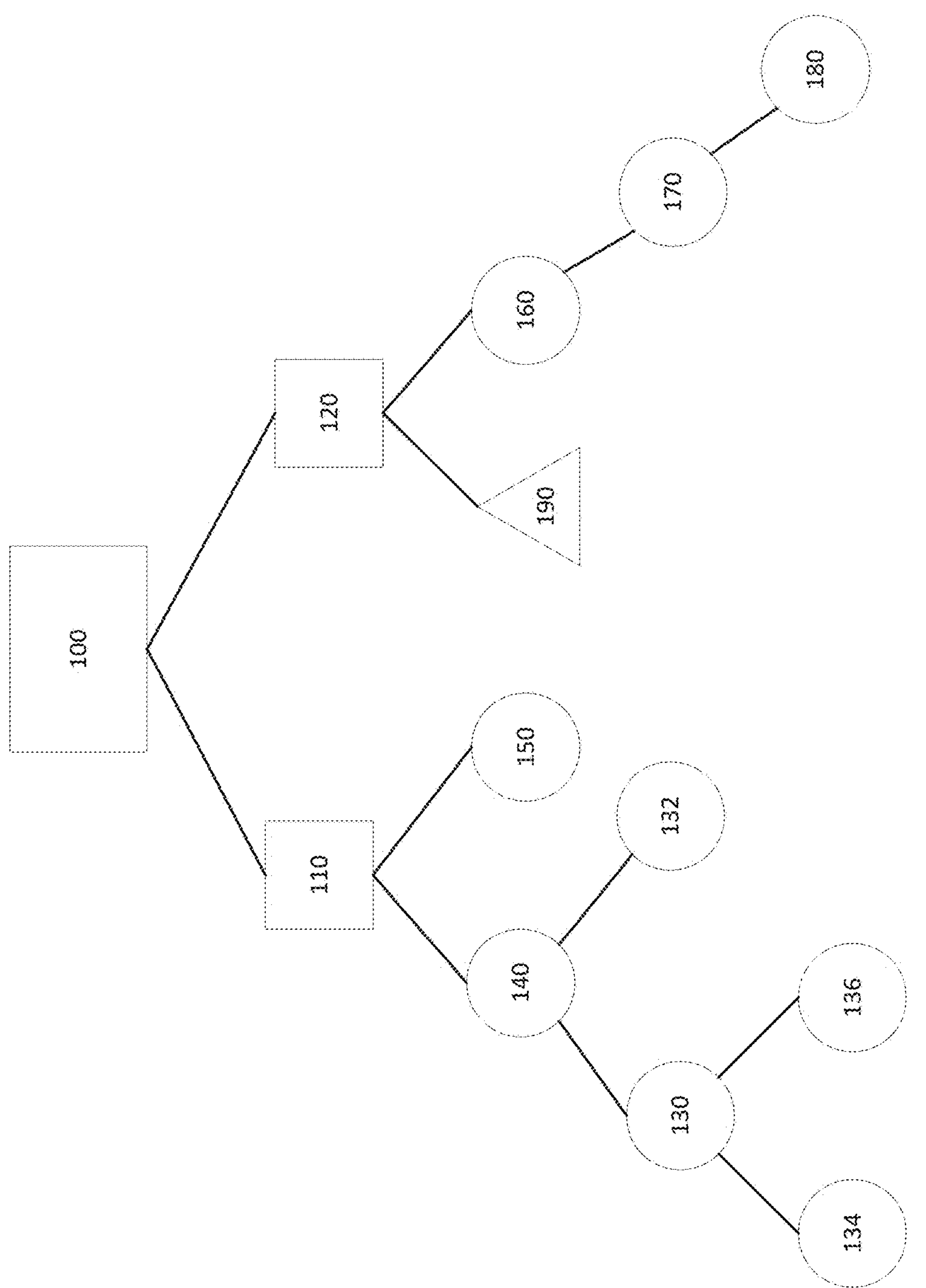
FIG. 1 depicts an operating environment that includes a wireless mesh network, according to certain examples of the disclosure.

An example of a resource distribution network is an electric distribution network or grid. The grid may include devices and components, such as substations, transformers, and switches, and may provide electricity to a number of premises. A meter may be associated with each premises that receives electricity. The meter may measure electric consumption at the premises, as well as other electric parameters, such as power, voltage, current, frequency, and phase. The meters may communicate with each other and with a central system, such as a head-end system. Each meter may be associated with a node on a wireless mesh network. Other devices, such as routers and collectors, may also be associated with nodes on the wireless mesh network.

Some of the nodes may be configured to analyze the collected data. The analysis may be performed by the node that collected the data or the analysis may be performed by another node on the network on behalf of the node that collected the data. In one example, a meter locates another node capable of providing analytic services that is available to perform the analysis using a directory node. The directory node provides directory services by maintaining information about the capabilities of service nodes. Service nodes are nodes which are able to perform an operation on behalf of another node. In response to receiving a service request from a node, the directory node identifies a service node and forwards the service request to the service node. In other examples, a node may send a request for assistance and wait for a service node to respond.

A service node may be topologically and geographically closer to a node that collects data than the head-end system. By using the services of a local service node, a number of advantages can be achieved over using only the services performed by the head-end system. One advantage is reducing the amount of time required to complete the analysis. There may be a delay between the time data is collected by a meter and the time that the head-end system receives the data which can delay analysis of the data. Analyzing the data using a local service node may eliminate the need to send the data to the head-end system for analysis so the analysis may be performed more quickly. Another advantage to analyzing data using a local service node is that the amount of network traffic may be minimized.

Yet another advantage is minimizing the cost of the hardware or other components needed to perform the analysis. Since a meter may use a service node to perform the analysis, the meter is not required to have the same capabilities as the service node. As opposed to adding the ability to perform analytics on every meter deployed in the field, distributing service nodes in the network allows devices without the ability to perform certain operations to remain in the network.

There may be multiple service nodes capable of performing a requested operation. A particular service node may be selected for a specific operation based on a selection policy. Selection policies include those that consider the capabilities or performance of the possible service nodes, the availabilities of the possible service nodes (e.g., least busy), the topological distances of the possible service nodes, or are random. By dynamically picking a service node to perform the analysis, the analysis may be performed quickly and efficiently based on the current conditions and pending requests.

Exemplary Operating Environment

FIG. 1 depicts an exemplary operating environment that includes a central system 100 and a wireless mesh network. The devices in the wireless mesh network may communicate with the central system 100 via devices 110, 120. Devices 110, 120 may be collectors and may communicate with the central system via additional devices and networks not shown in FIG. 1. In one example the nodes in the wireless mesh network may include meters, routers, collectors, and other network devices. A collector 110, 120 may be a directory node. A directory node maintains information about nodes that can assist other nodes with processing, i.e., maintains information about one or more service nodes. Other nodes may also be directory nodes. FIG. 1 illustrates that node 190 is a directory node.

A service node may be configured to provide services to other nodes. Typical services include processing or analyzing data collected by another node. In some instances a service node may be configured to have more processing capabilities than the nodes that it serves. In other instances a service node may have a similar level of processing capabilities to a node that it serves, but the node that it serves requires additional processing capabilities beyond what is currently available on the node.

In one example, the nodes 130-180 are associated with meters located at different premises, nodes 110, 120 are collectors, node 190 is a directory node, and central system 100 is a head-end system.

Communications Between Nodes

Figure 2:
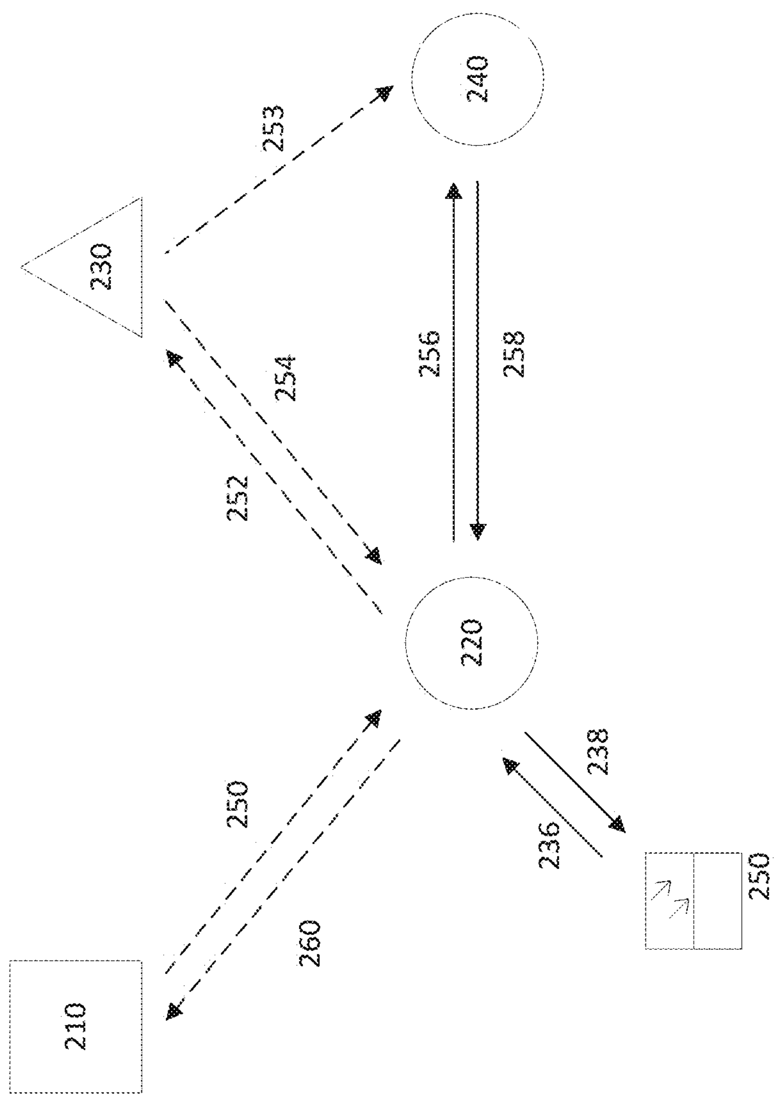
FIG. 2 depicts communications between nodes, according to certain examples of the present disclosure.

FIG. 2 depicts an example where a node requires assistance in processing its collected data and utilizes a service node. Node 220 may be associated with a meter located at a premises that includes a local generation device 250, such as a set of solar panels. The meter 220 collects data regarding electricity usage and production. An application or other program running on the meter requires analysis of the collected data. The meter 220 determines that it requires the services of another node to perform the analysis and sends a service request 256 along with the collected data to service node 240. Service node 240 satisfies the service request by performing the analysis and sends the results 258 of the analysis back to the meter. In this example, the meter 220 previously identified service node 240 as capable of providing the analysis. In some implementations, meter 220 may store information about one or more service nodes including the services provided by each service node.

FIG. 2 may also be used to depict an example where a node 220, discovers a service node that can provide assistance with a computational task, such as processing data. Once node 220 determines that it requires the services of another node to perform the analysis, if it does not have information about a node that is able to provide the service, then it may use a service request to identify a service node.

Node 230 may be a directory node and may maintain information about service nodes and the services that they provide. Node 220 may send a service request 252 to the directory node that identifies the service it needs and includes any data needed to perform the service. In this example, directory node 230 identifies service node 240 as available to provide the service and forwards the service request 253 to the service node. Service node 240 satisfies the service request and returns the result 258 to node 220.

If directory node 230 is also a service node, then directory node determines whether it can provide the service. If so, then directory node performs the service and returns the result 254 to node 220.

If directory node 230 is unable to perform the service or identify a service node to perform the service, then directory node may forward the service request to nodes in a layer that is topologically above the directory node. Referring back to FIG. 1, if node 136 is a directory node, then node 136 forwards the service request to nodes in the layer above node 136, i.e., nodes in the layer including node 130.

In some systems, a node may discover a service node without using a directory node. For example, node 220 may send a service request and the nodes that hear the service request may respond. One type of service request requests that any service nodes that hear the service request respond by identifying the service(s) they support. Another type of service request includes information about the type of service needed, and requests that only service nodes capable of providing the service respond.

Once node 220 discovers a service node by sending a service request or by using a directory node, node 220 may store information about the service node and its supported service(s) or capabilities for future use.

Node 220 may initiate the analysis based on an application or other program running on the node. For example, node 220 may be configured to perform the analysis periodically or based on a sensed condition. Alternatively, node 220 may initiate the analysis in response to receiving a communication from another node. Node 210 may send a request 250 to node 220 requesting node 220 perform the analysis or requesting information from node 220 that requires the analysis. If so, then node 220 initiates the analysis and uses service node 240 to complete the analysis. Node 220 may discover service node 240 using any of the foregoing discovery methods. After node 220 receives the results 258 from service node 240, node 220 responds 260 to node 210.

The service request may include a service identifier that identifies the type of service requested, a version number that identifies a version of the service, any data or other information needed from the requesting node, and the requesting node's address. The requesting node's address is included so the service node can send the results back to the requesting node. In some instances, the version number may indicate a specific version, whereas in other instances the version number may indicate a range, e.g., version 2.1 may indicate that any version 2.1 or greater is needed.

The requested service may be performed by multiple service nodes in parallel. For example, Node 220 may send parallel service requests to two service nodes. Alternatively, node 220 may send a service request to directory node 230 and directory node may perform part of the analysis and send a service request to service node 240 to perform other parts of the analysis.

Node 220 may use the result received from node 240 for actions such as updating an internal threshold or value, configuring or modifying the configuration of the node, controlling an internal or external component, etc.

Figure 3:
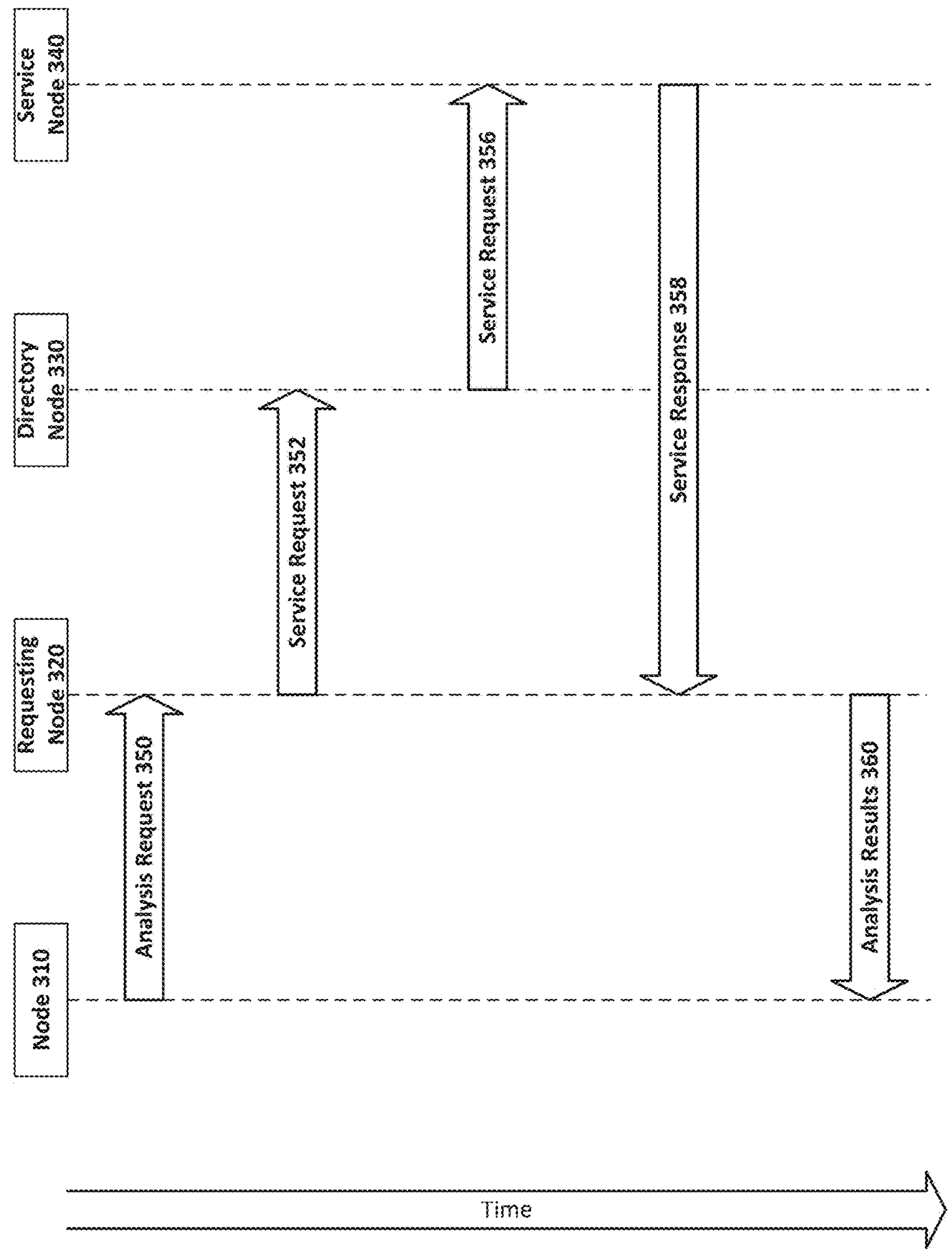
FIG. 3 depicts communications between nodes, including a directory node and a service node, according to certain examples of the present disclosure.

FIG. 3 depicts a diagram illustrating communications between nodes. The nodes include node 310 that requests information from another node 320, a directory node 330, and a service node 340. Node 320 collects data regarding electricity usage and other electric parameters. Node 310 requests 350 information from the requesting node 320 that requires analysis or other processing. Node 320 determines it requires the services of a service node to perform the analysis. Node 320 may require the services of another node because it is not configured to perform the analysis or because it is currently performing other operations and does not have available resources. Node 320 (the requesting node) sends a service request 352 to the directory node 330. The directory node 330 determines that the service node 340 is able to perform the requested service and forwards the service request 360 to the service node 340. The service node 340 satisfies the service request and sends the results 358 of the analysis back to the requesting node. In some examples, the requesting node transmits 360 the results of the analysis to node 310.

If the service node is unable to perform the analysis, then it sends a message back to the directory node 330 indicating that it is unavailable. In response, the directory node may identify an alternative service node and forward the service request to the alternative service node.

Exemplary Analytic Services

Figure 4:
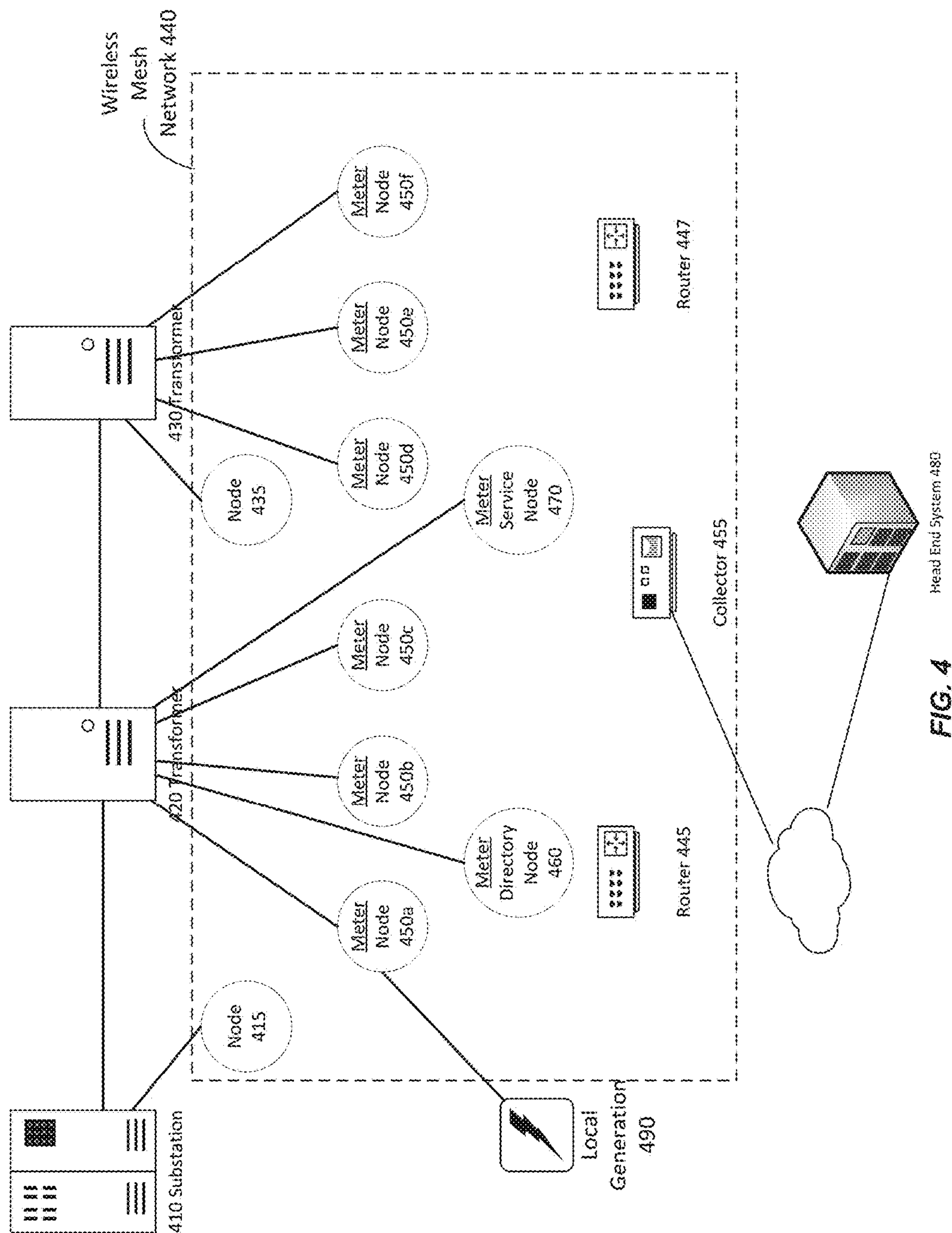
FIG. 4 depicts a diagram of a portion of an electric distribution network, according to certain examples of the present disclosure.

FIG. 4 depicts a block diagram illustrating an example of using distributed processing to perform analytic services. In this example, measurement data collected by a meter at a premises is used to assess the operational status of a transformer. A substation 410 provides power to transformer 420 and transformer 430. The transformers provide power to meters 450*a-f*, 460, 470. Meters 450*a-f*, 460, 470 are each associated with a premises. Meters 450*a-c*, 460, 470 are associated with transformer 420 and meters 450*d-f* are associated with transformer 430. The meters may be configured to measure electric parameters including, but not limited to, electricity usage or consumption, load, voltage, power, phase and harmonic data, at configurable time intervals. Meters 450*a-f*, directory node 460, service node 470, routers 445 and 447, and collector 445 are connected via a wireless mesh network. Collector 455 is also connected to the head end system 480.

Continuing with this example, meter 450*c* may be assigned to monitor the status of transformer 420. The assignment may be made when the meter 450*c* is initially deployed or may be made in response to receiving a command. Meter 450*c* collects data over a number of time intervals. The data and/or time intervals may correspond to the same data or time intervals used by the meter to determine consumption or they may be distinct. At a predetermined time for performing the analysis or in response to a communication from another node instructing the meter to perform the analysis, the meter 450*c* initiates the analysis. Once the meter initiates the analysis, the meter determines that it does not have the resources to perform the analysis.

If the system supports directory nodes, then the meter may send a service request to directory node 460 to request the assistance of a service node. The directory node 460 identifies service node 470 as being capable of performing the analysis. The directory node 460 forwards the service request to the service node 470. The service node 470 analyzes the data and provides the results of the analytic services to meter 450*c*. The results may indicate the operational status of transformer 420 or may provide a result that can be used to determine the status of the transformer. The meter 450*c* may initiate an action based on the results of the analysis. The action may be to report the results back to another system, such the head-end system 480.

Although FIG. 4 illustrates that the directory node 460 and the service node 470 are associated with meters, a directory node and/or the service node may be associated with other network devices including, but not limited to a router or a collector. In some instances, the directory node may also be a service node. In these instances, when the directory node receives a service request from a meter, the directory node may provide the services. If the directory node is not able to provide the services, then it may redirect the service request to another service node. Alternatively, a directory node that is also a service node may redirect the service request to another service node if that service node is better suited to handle the request regardless of whether the directory node is available. The service node may be better suited to handle the request if it has updated software, is more lightly loaded, or is topologically closer to the meter.

In another example, meter 450*e* is assigned to monitor the status of transformer 430. Meter 450*e* collects data over a plurality of intervals. Meter 450*e* analyzes the data or uses a service node to analyze the data. Based on the analysis meter 450*e* determines that it needs information about the status of transformer 420 to complete the analysis. Meter 450*e* may request that service node 470 obtain information about the status of transformer 420. Service node 470 may communicate with one or more of meters 450*a*-450*c* to determine the status of transformer 420. Alternatively, meter 450*e* may request information about the status of transformer 420 from one of the meters associated with transformer 420.

By distributing service nodes among the meters and by using the service nodes to analyze data collected by the meters, a large number of transformers may be pro-actively monitored, and the monitoring may be applied down to the distribution transformer level. The results may be aggregated and may be sent to the head-end system or otherwise used to maintain the electric distribution network.

Transformer monitoring may include thermal change monitoring or frequency response analysis. The useful life of a transformer is determined partially by the ability of transformer to dissipate internally generated heat to its surroundings. The comparison of actual and predicted operating temperatures may be used to identify abnormal operation. The consequences of temperature rise may not be sudden, but gradual as long as it is within break down limit. Among these consequences, insulation deterioration is economically important since insulation is very costly. Thermal modelling may use a mathematical model that predicts the temperature profile of the transformer using the principle of thermal analysis. The thermal model is used to determine the top oil temperature and hot spot temperature (maximum temperature occurring in the winding insulation system) temperature rise. In one example, a service node may be configured to provide thermal modelling.

When a transformer is subjected to high currents through fault currents, the mechanical structure and windings are subjected to severe mechanical stresses causing winding movement and deformations. It may also result in insulation damage and turn-to-turn faults. Frequency response analysis (FRA) is a non-intrusive technique for detecting winding movement faults and deformation assessment caused by loss of clamping pressure or by short circuit forces. FRA technique involves measuring the impedance of the windings of the transformer with a low voltage sine input varying in a wide frequency range. A service node may be configured to provide FRA.

In yet another example illustrated by FIG. 4, a local generation device 490 is capable of providing electrical power to the grid. The device 490 may include solar panels, batteries, smart inverters, or other methods of storing or generating power at the premises associated with meter 450*a*. The meter 450*a* may be configured to collect measurement data related to the operation of the electrical grid and the local generation device 490, such as harmonics and phase data.

Meter 450*a* may perform harmonics and phase analysis with respect to the local generation device 490. In this example, meter 450*a* is unable to perform the requested analysis and sends a service request to service node 470 to request analytic services for the collected data. The service node 470 performs the requested analysis and responds to meter 450*a* with the results. The meter 450*a* may compare the results to a threshold or range of predetermined values or may compare the results to previous results. If the results exceed the threshold/range or significantly deviate from the previous results, then the power generated by the local generation device 490 may be out-of-phase, and the meter 450*a* may send a communication to the head-end system 480. In some instances, the head-end system may send an instruction to the meter 450*a* to take certain actions, such as controlling the operation of the local generation device 490 or controlling the connection of the local generation device.

In yet another example, analytics provided by a service node are used to optimize feeder voltages to manage mismatches between local generation and demand. When a local generation device uses solar power, then peak demand may occur after sunset when solar power is no longer available. To address the difference between demand and local generation over the course of a day (i.e., to address the duck curve), a service node may provide real time or near real time analytics using data collected by the meters or other devices. When a meter uses a service node to analyze collected data at a point on the electric distribution network close to the meters, the analysis may be performed more quickly and control may be more responsive than if the analysis is performed at the head-end system.

To monitor consumption, a meter may collect data for a number of time intervals over a period of time. For example, a meter may collect data for a number of 15 minute time intervals over a 24 hour period of time. The meter may communicate the collected data to a head-end system once every 24 hour period so that the head-end system may determine consumption at the premises associated with the meter. If the head-end system is used to analyze the data, then there is a delay in performing the analysis since the data may be sent to the head-end system only once every 24 hours. This delay may be significantly reduced by distributing service nodes throughout the system. A meter may send its collected data to a service node that is local to the meter for analysis using a different schedule than it uses to send data to the head-end system. For example, the meter may send data collected for one or more 15 minute time intervals to a service node every hour to perform an analytic service. If the same 15 minute time interval is used to determine consumption and perform the analytic service, then data from multiple 15 minute time intervals may be aggregated to provide data for the 24 hour time period to the head-end system. The meter may use a time interval that is distinct from the time interval used to determine consumption. It may use a shorter or longer time interval. Using a service node to analyze the data collected by the meter may allow the analysis to occur more often since the meter may request (or perform) analysis of the collected data more frequently. This may allow better control of feeder voltages to address the difference between demand and local generation since demand may vary in real time.

Service nodes or directory nodes may be associated with devices other than meters. In one example, a node associated with a substation may provide analytic services and/or directory service to one or more of its downstream meters. Node 415 may be configured to provide analysis related to demand and local generation. Based on the results of the analysis, node 415 associated with the substation may determine a feeder voltage for the substation and may adjust the voltage accordingly.

Figure 5:
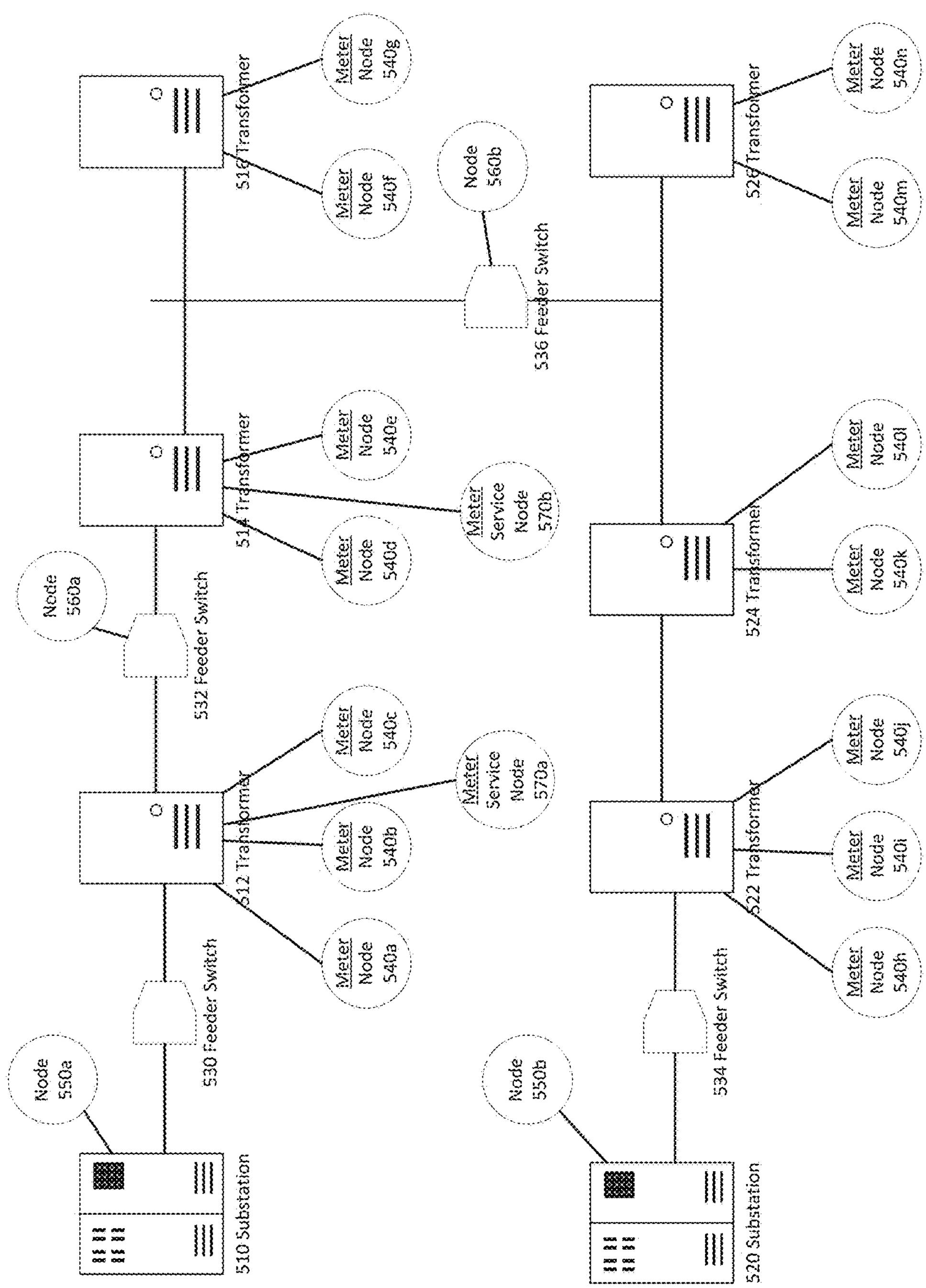
FIG. 5 depicts a diagram of portion of an electric distribution network, according to certain examples of the present disclosure.

FIG. 5 depicts a portion of an exemplary electric distribution network that includes feeder switches. The feeder switches may be configured so that substation 510 powers transformers 512, 514, 516 and substation 520 powers transformers 522, 524, 526. Feeder switches 530-536 are placed on the power lines at various locations and may be used to control the flow of power on the grid. Meters 540*a*-*n*, 570*a*-*b* are connected to the transformers and provide metrology services to an associated premises. The meters 540*a*-*n*, 570*a*-*b*, as well as other additional nodes may collect information about the operation of the electric distribution network and may communicate with each other via one or more wireless mesh networks. The additional nodes may be associated with other devices on the electric distribution network, such as substation 550*a* or feeder switches 560*a*, 560*b*.

In one example, the nodes collect measurement data or other information about the operation of the electric distribution network in order to analyze the current configuration of the feeder switches. The collected measurement data may be analyzed to determine when and how to control the feeder switches to minimize the impact of an event, such as an outage or changes in demand.

A group of nodes that are associated with a defined area of service for the feeder switches being analyzed are selected to perform an analysis. For example, to assess feeder switches 530 and 532, at least one meter associated with transformer 512 and at least one meter associated with transformer 514 may be selected.

The selected meters collect information about the operation of the electric distribution network. If any of the selected meters require a service node to analyze the collected information, then the meter may send a service request seeking a service node. In this example, a meter identifies a service node without using a directory node. The meter sends a service request. If a service node is able to provide the requested services, then the service node may respond indicating the services that it may provide. Alternatively, the service node may perform the analysis and sends a response message containing the results to the selected node that requested the service. The service node that assists the meter is not limited to a service node connected to the same transformer. For example, node 550*a*, which is associated with substation 510 may provide services to meters associated with transformer 512.

Once the collected information is analyzed, the results may be sent to node 550*a*. Node 550*a* may use the results to determine what action to take. In some instances, node 550*a* may determine whether to turn one or both of the feeder switches 530, 532 ON or OFF. Node 550*a* may not have the authority to control other devices, such as feeder switches 550, 532. If it does not have sufficient authority, then the node may transmit the results of the analysis, which may include recommendations for actions to be taken, to a system that has the authority to control the feeder switch, such as a node associated with the feeder switch or a head-end system.

Exemplary Node

Figure 6:
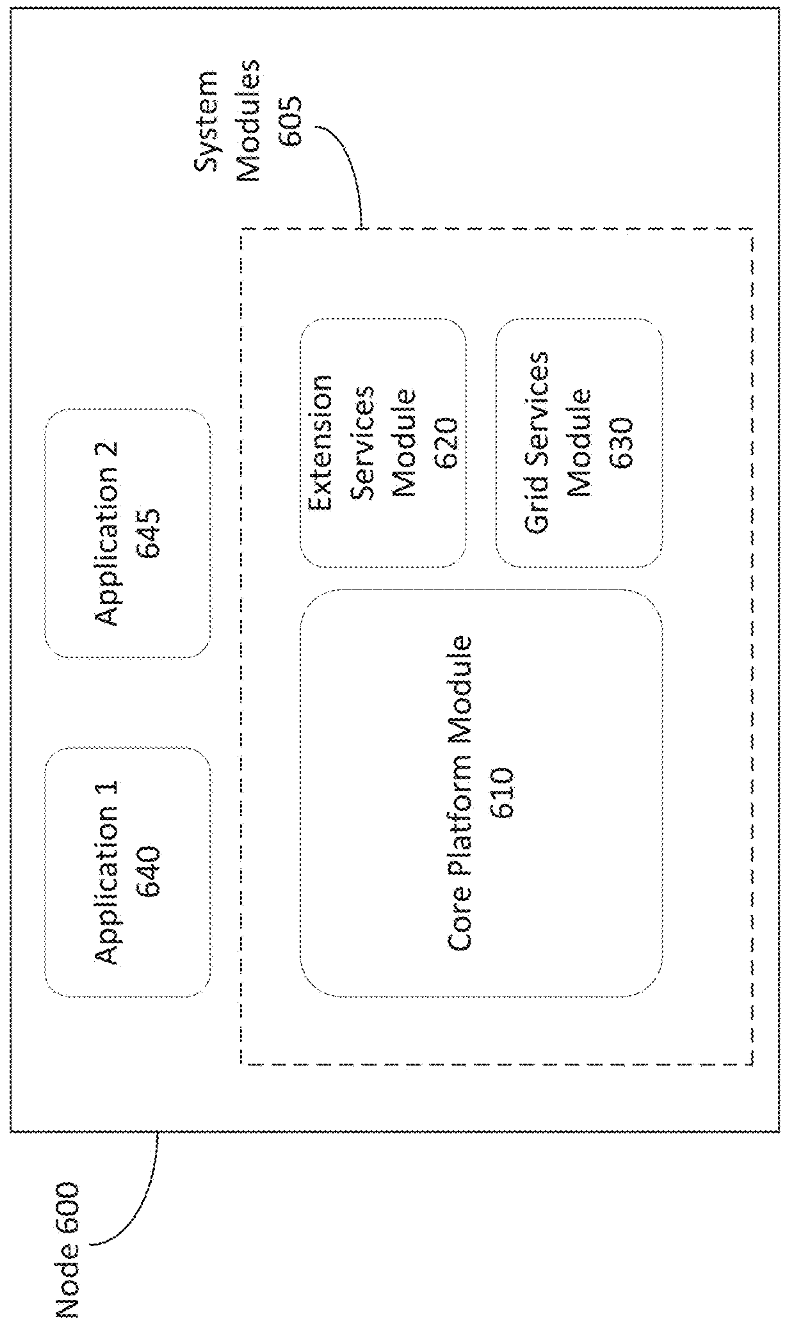
FIG. 6 depicts an example of a node, according to certain examples of the present disclosure.

FIG. 6 depicts an exemplary node 600. The node includes a core platform module 610 and applications 640 and 645. The core platform module 610 provides a basic computing framework for applications 640 and 645. In one implementation, the core platform module 610 may be coded in Java. In addition to the core platform module, the node may also include an extension services module 620. The extension services module extends the services provided by the core platform and thus extends the capabilities of node 600. The extension services module may allow the node to discover and communicate with directory nodes and service nodes, and it may enable the node to support additional advanced functions, features, and applications, such as distributed computation, aggregation of raw data over groups of nodes, transactional energy, digital wallet/block chain, integration of cognitive computing/AI capabilities, predictive analytics, pattern recognition, etc.

The core platform module 610 may provide the applications with a consistent interface to the services provided by the services modules via an application programming interface (API). The services modules and the core platform module are collectively referred to as system modules 605. Different nodes may have different services modules or may have services modules that support different functions. For example, the extension services module in a directory node may support directory functions, whereas the extension services module for a different type of node may support only discovery of a directory node.

Services modules other than extension service module 620 may also be included. Services modules may include grid analytics services module 630 that supports transformer health monitoring, phase harmonics monitoring, duck curve flattening, and feeder switch management. Additional analytic services may also be provided including information services, computational services, storage services, and translation services. Information services may include services related to weather, energy pricing, time of use (TOU) scheduling, and notifications. Computational services may include analytics, as well as computations related to transactional energy, energy trading, and energy forecasting. Storage services may include storing data or other information on behalf of another node or device. Translation services include translating between different protocols. The services provided by a services module may also be accessed through requests that originate from other nodes on the wireless mesh network. Communication services may include communications with external entities, such as email, text, or messaging. Services modules may be added or updated.

The extension services module 620 may be configured to request services from other nodes or provide services to other nodes. An application 640 on the node may initiate an analysis of collected data. The application accesses the core platform module 610 using an API. If the system modules of the node do not support the analysis, the core platform module may pass the request to the extension services module 620, which may send a request to a directory node or to a service node.

Node 600 may include a processor, memory, and a transceiver device. The transceiver device can include or be coupled to an antenna for communicating with other nodes on the wireless mesh network. The processor can include any number of computing devices and can be communicatively coupled to computer-readable media, such as memory. The processor can execute computer-executable program instructions or access information stored in memory to perform operations, such as those described herein. When instructions, such as those provided in the core platform module or the extension services modes 620 are executed, they may configure the node to perform any of the operations described herein. The components of the node are not limited to any particular hardware architecture or configuration.

General Considerations

Numerous specific details are set forth herein to provide a thorough understanding of the claimed subject matter. However, those skilled in the art will understand that the claimed subject matter may be practiced without these specific details. For example, the node collecting the data or requesting services from a service node is not limited to a meter. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more examples of the present subject matter. Any suitable programming, scripting, or other type of language or combinations of languages may be used to implement the teachings contained herein in software to be used in programming or configuring a computing device.

Examples of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific examples thereof, it will be appreciated that those skilled in the art, upon attaining an understanding of the foregoing, may readily produce alterations to, variations of, and equivalents to such examples. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by a node, comprising:

collecting, by a first node located at a point on an electric distribution network, data related to an operation of the electric distribution network over a plurality of time intervals;

determining, by the first node, that an analysis of the collected data is needed and that the first node requires services of another node to analyze the collected data;

transmitting, by the first node, a service request to a directory node via a wireless mesh network requesting assistance from a service node that is capable of the analysis of the collected data, wherein the service request identifies a service for performing the analysis and includes the collected data and an address for the first node, wherein the wireless mesh network includes a root node, wherein the directory node is topologically located in a layer below an intervening layer that is located between the root node and the directory node, and wherein the directory node maintains information on capabilities of a plurality of service nodes;

receiving, by the directory node, the service request from the first node via the wireless mesh network;

determining, by the directory node, whether one of the plurality of service nodes satisfies the service request;

in response to determining that one of the plurality of service nodes satisfies the service request, identifying, by the directory node, the service node that satisfies the service request, and forwarding, by the directory node, the service request to the identified service node;

in response to determining that the plurality of service nodes do not satisfy the service request, transmitting, by the directory node, the service request to at least one service node in the intervening layer to identify a service node that satisfies the service request; and receiving, by the first node, a response from the identified service node via the wireless mesh network, wherein the response from the identified service node includes at least one result of the analysis of the collected data.

2. The method of claim 1, further comprising:

transmitting, by the first node, a second service request to the directory node via the wireless mesh network, wherein the second service request identifies a second service; and receiving, by the directory node, the second service request from the first node via the wireless mesh network.

3. The method of claim 1, further comprising:

collecting, by the first node, consumption data over a time period that includes the plurality of time intervals, wherein the consumption data corresponds to a premises associate with the point on the electric distribution network; and transmitting, by the first node, the consumption data for the time period to a head-end system after the time period, wherein the first node transmits the collected data to the directory node prior to transmitting the consumption data to the head-end system.

4. The method of claim 1, wherein a local generation device is connected to the point on the electric distribution network, the collected data includes load and voltage data, and the at least one result is used for controlling a feeder voltage from a substation.

5. The method of claim 1, wherein a local generation device is connected to the point on the electric distribution network, the collected data includes harmonics and phase data that indicates out-of-phase power, and the at least one result is used for controlling connection of the local generation device to the electric distribution network.

6. The method of claim 1, further comprising:

identifying, by the directory node, a second service node as satisfying the service request;

comparing, by the directory node, a performance metric of the service node and a performance metric of the second service node; and selecting, by the directory node, the service node based on the comparison.

7. The method of claim 1, wherein the directory node and the service node are associated with a single node.

8. The method of claim 1, wherein the directory node and the service node are distinct nodes and wherein forwarding the service request to the service node comprises forwarding the service request via the wireless mesh network.

9. A system, comprising:

a first node associated with a first distribution transformer and capable of measuring a first electric parameter at a first premises related to the first transformer over a plurality of time intervals;

a second node associated with a second distribution transformer and capable of measuring a second electric parameter at a second premises related to the second transformer over the plurality of time intervals; and a third node capable of providing analytic services to a plurality of nodes connected via a wireless mesh network, wherein the third node is topologically located in a layer below an intervening layer that is located between a root node of the wireless mesh network and the third node, and wherein the first, second, and third nodes are connected via the wireless mesh network, wherein the first distribution transformer and the second distribution transformer are connected to an electric distribution network downstream of a substation, wherein the first node determines that it requires services of another node to analyze collected measurement data for the first electric parameter for the first transformer, the first node sends a service request to the third node that requests analytic services, includes the collected measurement data, and includes an address for the first node, and the third node provides the analytic services using the collected measurement data and returns a response message to the first node, via the wireless mesh network, wherein the response message includes a result indicating an operational status of the first transformer.

10. The system of claim 9, wherein the first node stores information about services provided by the third node, and the first node uses the stored information to select the third node to receive the service request.

11. The system of claim 9, wherein the second node requests the operational status of the first transformer from the first node, and in response, the first node determines that it requires services of another node to analyze collected measurement data for the first electric parameter.

12. The system of claim 9, wherein the first node includes a core platform module, and an extension services module for discovering a node that provides analytic services.

13. The system of claim 9, wherein the first node is associated with a first meter located at a first premises, the second node is associated with a second meter located at a second premises, and the third node is associated with a third meter associate with a third premises.

14. The system of claim 9, wherein the third node is capable of providing directory services to the first node and the second node, wherein the third node stores information about a plurality of service nodes and a service associated with each service node, including information about the third node and the analytic services provided by the third node.

15. A method for controlling a feeder switch, comprising;

collecting data by a first set of nodes, wherein each node in the first set of nodes is associated with a point on an electric distribution network within a defined area of service around a first feeder switch and each node in the first set of nodes communicates with at least one other node in the first set of nodes via a wireless mesh network;

collecting data by a second set of nodes, wherein each node in the second set of nodes is associated with a point on the electric distribution network within a defined area of service around a second feeder switch and each node in the second set of nodes communicates with at least one other node in the second set of nodes via the wireless mesh network;

analyzing the data collected by the first set of nodes by a first service node;

analyzing the data collected by the second set of nodes by a second service node;

determining a first operational state for the first feeder switch and a second operational state for the second feeder switch and a sequence for placing the first feeder switch in the first operational state and placing the second feeder switch in the second operational state based on the analysis of the data collected by the first set of nodes and the analysis of the data collected by the second set of nodes, wherein the first operational state and the second operational state comprising an ON state enabling power to flow through the respective feeder switches and an OFF state preventing power from flowing through the respective feeder switches; and controlling the first feeder switch and the second feeder switch according to the sequence.

16. The method of claim 15, wherein the first set of nodes includes meters located at a first set of premises within the defined area of service around the first feeder switch and the second set of nodes includes meters located at a second set of premises within the defined area of service around the second feeder switch.

17. The method of claim 15, wherein analyzing the data collected by the first set of nodes by a first service node includes:

sending a service request by at least one node in the first set of nodes to the first service node, wherein the service request identifies a service for analyzing the data collected by the first set of nodes and includes an address for the first node.

18. The method of claim 17, wherein analyzing the data collected by the first set of nodes by a first service node includes:

sending a service request by at least one node in the first set of nodes to a directory node, wherein the service request identifies a service for analyzing the data collected by the first set of nodes;

using the directory node to determine that the first service node provides the service; and sending the service request from the directory node to the first service node.

* * * * *